Oct. 21, 1952     T. J. SMULSKI     2,615,085
ELECTRICAL INDICATING SYSTEM
Filed March 2, 1950
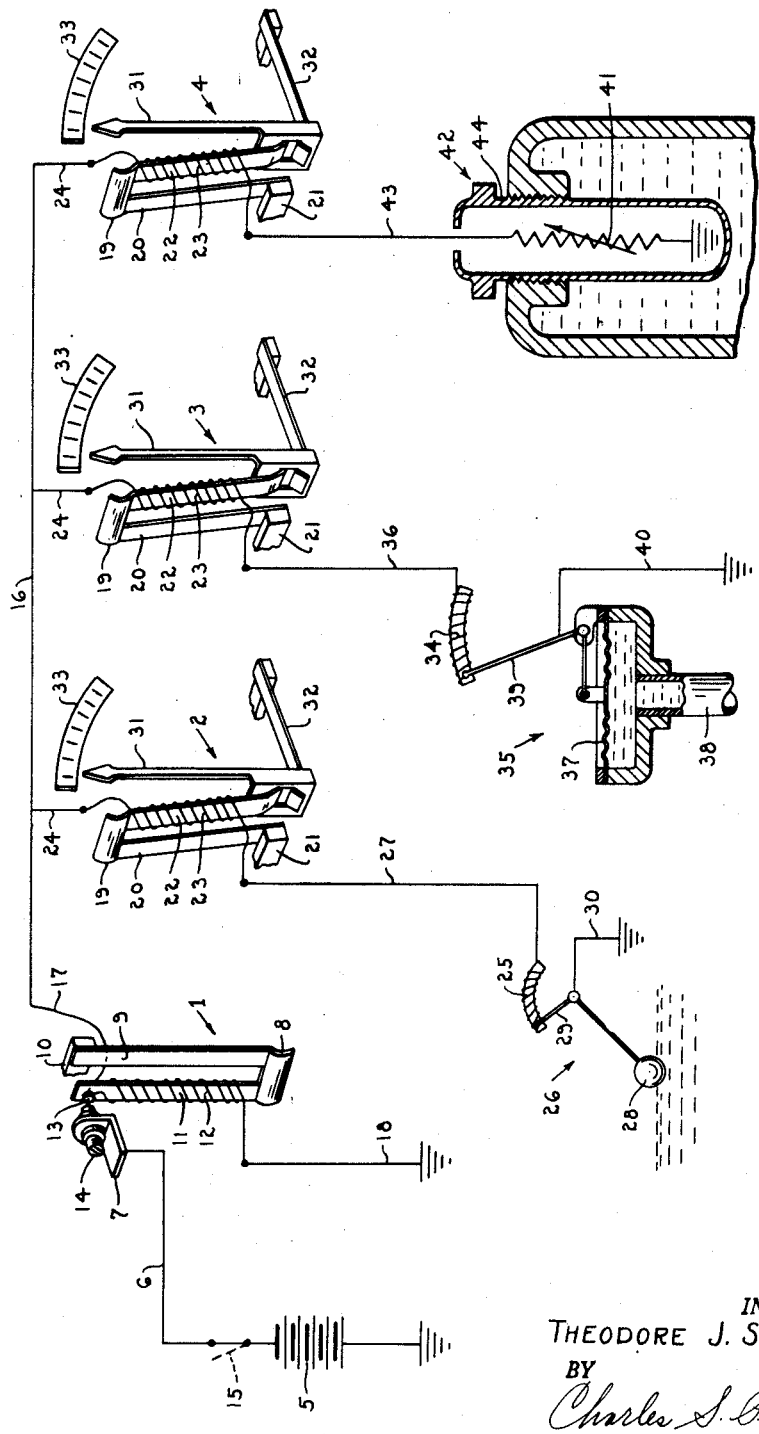
INVENTOR.
THEODORE J. SMULSKI
BY
Charles S. Penfold
ATTORNEY Patented Oct. 21, 1952

2,615,085

UNITED STATES PATENT OFFICE 2,615,085

ELECTRICAL INDICATING SYSTEM

Theodore J. Smulski, Gary, Ind., assignor to The Anderson Company, a corporation of Indiana Application March 2, 1950, Serial No. 147,285

7 Claims. (Cl. 177—351)

This invention relates generally to electrical systems and is directed to thermo-responsive apparatus adapted to indicate accurately a variable condition when other conditions affect or influence the operation of the system in a manner tending to render the apparatus inaccurate.

More particularly, the invention is adaptable for various uses requiring the accurate control of a suitable indicating instrument and in which the effect of various conditions other than that to be measured tend to prevent accurate response of the indicator in accordance with a measurable condition.

In the present embodiment of the invention the system is arranged to effect remote indication of the quantitative value of a physical condition, such system being capable of varying characteristics of its circuit at the station under control of the physical condition in accordance with a variation of the condition to be indicated.

The invention may be used wherever applicable but as herein illustrated is used in connection with various components of an automotive vehicle, such as a liquid level device for showing any variation in the volume of a fuel supply, a pressure device for showing any variation in the oil pressure, and a temperature device for showing any variation in the temperature of the cooling medium.

In batteries used as a source of power extensive voltage variations exist in the circuits. The subject invention provides means for maintaining the effective voltage constant. Furthermore, some circuits are economically unsuited to certain applications of installation because of the complexity of the circuit and various structural arrangements involved therein.

An important object of the invention is to provide a new and improved electrical system for accurately indicating quantitatively a variable factor which system will overcome certain limitations of the systems of the prior art and which will be simple, reliable and economical to operate. More particularly in this respect, the principal object is to provide a system for maintaining a constant effective average voltage across a plurality of indicating instruments or gauges and their respective control resistors, the average effective voltage being substantially constant irrespective of load variations or fluctuations in the voltage at a source or battery.

Also an important object of the invention is to provide means whereby the value of the effective constant voltage obtaining in the system may be readily adjusted.

A further object of the invention is to provide an electrical system for remote indication in which a single circuit interrupter serves a plurality of sets of sending and receiving instruments.

Other objects and advantages of the invention will become increasingly important after the description hereinafter set forth is considered in connection with the accompanying drawing, in which:

Figure 1 is a diagrammatic view of a preferred form of the invention.

As pointed out above, the invention may be employed wherever found applicable but as herein illustrated it is exemplified as being operatively associated with a plurality of components of an automotive vehicle such as a liquid level device, an oil pressure device and a temperature device.

The system is illustrated diagrammatically and it is to be understood that the usual suitable casings or housings are provided for the various instruments and that the appropriate electrical elements or components are properly supported and insulated.

The system includes what may be termed a primary instrument generally designated 1 which is connected in parallel with a plurality of secondary indicating instruments generally designated 2, 3 and 4, the arrangement being such that variations in the voltage of the battery source 5 are averaged or compensated for by means of a pulsating bimetal and the system functions to maintain a substantially constant effective average voltage condition in the instruments 2, 3 and 4. More specifically in this regard, the voltage obtaining in any of the secondary instruments will be identical with that obtaining in the primary instrument since the instruments are connected in parallel relation and because it is recognized that if more than one resistance is connected in parallel the voltage across each resistance is the same regardless of the value of each resistance.

As clearly illustrated in the drawing, a conductor 6 connects the source or battery 5 with a mounting 7. The primary instrument includes a thermo-responsive unit 8, preferably constructed of bimetallic material. This unit is preferably U-shaped to include an ambient temperature compensating leg 9 secured to a support 10, and a leg 11 which is adapted to be heated by a heating element 12 for affecting movement of a contact 13 on the end of leg 11 relative to an adjustable contact 14 carried by the mounting 7.

The heating element 12 is connected to contact 13 and the latter to a common conductor 16 by a conductor 17. The heating element is grounded to a vehicle metal frame by a conductor 18.

A switch 15 may be placed in the circuit. When the switch 15 is closed current will flow through conductor 6, mounting 7 contacts 14 and 13 and through heating element 12 to ground, for the purpose of heating leg 11 to cause it to flex and move the contact 13 away from the adjustable contact 14 to open the circuit from the source 5 through conductor 6 and through these contacts. When this circuit is interrupted the leg 11 will cool and cause the contact 13 to re-engage contact 14 to again close the circuit and this operation will be repeated indefinitely, thereby causing a pulsating direct current to flow through the circuit to maintain the effective voltage constant. The value of such voltage is predetermined by adjusting the contact 14.

In order to compensate for variations in ambient temperature and maintain a predetermined energy flow, the leg 9 is provided, and any warping or flexing of the leg 11, due to variations in ambient temperature, will be compensated for by the corresponding flexing of the leg 9 which tends to move the entire unit relative to its support 10, thereby maintaining the same action of the leg 11 relative to the contact 14, regardless of variations in ambient temperature.

The secondary instruments 2, 3 and 4 may be substantially identical in character and operation. Each instrument is a milliammeter and preferably includes a substantially U-shaped thermo-responsive unit 19, constructed of bimetallic material, having an ambient temperature compensating leg 20 anchored to a support 21 and a leg 22 which is adapted to be heated by a heating element 23. Each of the heating elements is electrically connected to the common conductor 16 by a conductor 24.

A variable resistance 25 of a condition responsive device 26 is connected in series with the heating element 23 of instrument 2 by a conductor 27. This device may be in the form of a liquid level device and includes a float 28 which actuates a contact arm 29 engageable with the resistance 25. The resistance and contact arm constitute a rheostat which is arranged to increase and decrease resistance in the circuit in response to movement of the float. This rheostat serves to control the flow of energy through the secondary indicating instrument 2 in proportion to the liquid level and is grounded by a conductor 30.

Each of the secondary indicating instruments also includes a pointer 31 which is pivotally supported by the bimetallic leg 22 of the unit 19 and a biasing means 32 relative to a suitable dial 33 constituting a part of an instrument.

It will be apparent that with the float 28 in the position illustrated in the drawing, a low liquid level is indicated and a minimum amount of current will flow through the circuit because of the maximum resistance of rheostat 25. Therefore, the pointer 33 which is adjusted to zero with the maximum resistance in circuit, will remain at zero indicating the low liquid level. As the float 28 is raised in response to a higher liquid level, the rheostat is operated to decrease the resistance and to cause an increased flow of current through heating element 23 to flex bimetallic leg 22 and move the pointer 33 commensurably over the dial 33.

Voltage variations of the source 5 are compensated by corresponding variations in the duration of individual pulsations of current in the circuit. The primary instrument 1 functions to cause the energy flowing through that part or parts of the circuit in which it is connected, to have a constant effective value. If the voltage drops, the current flows for a longer period during each pulsation and if the voltage increases, the current flows for a shorter time during each pulsation.

The operating temperature of bimetallic leg 11 may be adjusted to operate at a higher or lower temperature as required above the ambient temperature by the adjustment of contact 14 relative to contact 13. Specifically an increase in the operating temperature differential of bimetallic leg 11 will require an increase in the electrical energy passing through heating element 12. As the resistance of heating element 12 is substantially constant, such higher operating temperature for bimetallic leg 11 will require a higher average effective voltage across the heating element 12 and such higher average effective voltage appears simultaneously across each of the circuits connected in parallel with heating element 12.

The secondary instrument 3 is connected to a variable resistance 34 of a condition responsive device 35 by a conductor 36. This device may be in the form of an oil pressure indicator and includes a diaphragm 37 which is sensitive to variations in oil pressure obtaining in a line 38. The arrangement is preferably such that when the pressure increases the diaphragm will actuate a contact arm 39 to include less of the resistance 34 in the circuit, and when the pressure decreases more resistance will be included. The variable resistance 34 and arm 39 constitute a rheostat to control the flow of energy through instrument 3. This rheostat is grounded by conductor 40.

The secondary instrument 4 is connected to a variable resistance 41 of a heat sensitive device 42 by a conductor 43. The resistance value of resistor 41 varies in accordance with variations in temperature, thereby controlling the flow of energy through instrument 4. This heat sensitive device 42, among other things, includes a sealed housing 44 which, for example, may be plugged into an engine block for contact with the cooling medium, the arrangement preferably being such that when the temperature of the cooling medium lowers the resistance 41 will be increased to control the actuation of the pointer constituting a component of instrument 4.

In view of the foregoing it is evident also that the differential between the operating temperature of the bimetallic leg 11 and the ambient temperature may be varied by a variation in the adjustment of the position of contact 14 relative to contact 13. By advancing contact 14 toward contact 13 a higher temperature of bimetallic leg 11 is required to break the contacts and interrupt its circuit. Such higher temperature, which may be predetermined at any one of an infinite number of temperatures, is simultaneously reflected in relatively higher temperatures in each of the bimetallic legs 22 which influence the position of indicating pointers 33. To attain any such predetermined degree of temperature in bimetallic leg 11, as required to break the contact and interrupt the circuit, a minimum voltage in the circuit is required to be maintained. Under practical operative conditions a voltage substantially above said minimum is desirable.

The system effects a regulation of voltage in the sense that by the interruption of the circuit, at intervals determined by voltage intensity, an average effective voltage is maintained. This average effective voltage is predetermined by the degree of temperature required in bimetallic leg 11 to break the contact, which temperature is effected by the transfer of heat from heating element 12. The rate at which the heat is transferred by heating element 12 is determined by the voltage intensity in the circuit. Thus, a higher voltage effects within a shorter period of time the transfer of the amount of heat required to break the contact and the contact breaks become more frequent to compensate for increases in voltage in the circuit. This is the sense in which the system is a regulator of average effective voltage.

By reference to U. S. Letters Patent 2,205,637, issued June 25, 1940 to Theodore J. Smulski, it will be seen that there is disclosed "a primary instrument" identical in function to the primary instrument 1 of the subject application. Also, in this patent two wires or conductors are shown for connecting the secondary instrument with a variable resistance of a condition responsive device, whereas in the present disclosure only one wire is shown for establishing a connection between each secondary instrument and a condition responsive device. Thus, it will be seen that, while in essence the two systems are the same, the arrangement illustrated herein does offer, under certain conditions, some advantages in cost of manufacture and installation. It will be noted that claims of the issued patent mentioned cover a system operable according to the present application.

Having thus described my invention, it is obvious that various modifications may be made in the same without departing from the spirit of the invention, and, therefore, I do not wish to be understood as limiting myself to the exact form, construction, arrangement and combination of parts herein shown and described and defined in the claims.

I claim:

1. In an electrical indicating system, a source of electric power, a thermally responsive voltage regulator provided with a heating element, a pair of contacts, a thermally responsive indicating instrument provided with a heating element connected to the source in series with the contacts, a variable resistor connected in circuit with the heating element of the indicating instrument to control the flow of current through the instrument, and means remote from the voltage regulator and responsive to a condition to be indicated for varying said resistor, said contacts being controlled by said thermally responsive voltage regulator and connected in series with the source of power and the heating element of the voltage regulator whereby the average voltage across said contacts will be maintained substantially constant so that said indicator is energized by said average constant voltage.

2. The combination comprising a thermally responsive indicating device provided with a heating element, a pointer actuated by said device, a variable resistor connected in circuit with said element to control the flow of energy through the indicating device, means responsive to a physical condition to be indicated for varying said resistor, a source of electrical power, and means connected in series with said source and in parallel with the heating element of said indicating device and said resistor for maintaining substantially constant the average voltage across said indicating device irrespective of any variations in the resistance of the heating element of the device and/or any variations of voltage at the source, said means comprising a second thermally responsive device provided with a heating element for controlling the flow of energy through the heating elements, and a pair of contacts connected in series with said last mentioned heating element, at least one of said contacts being controlled by said second thermally responsive device.

3. The combination comprising an electrical indicating instrument, a variable resistor connected in circuit with the indicating instrument to control the flow of energy therethrough, means responsive to a condition to be indicated for varying said resistor, a source of electric power subject to voltage variations, a thermally responsive voltage regulator device provided with a heating element connected in parallel with the indicating instrument and in series with the source of electric power for maintaining a predetermined constant flow of energy through the device and through the indicating instrument, said device including a pair of contacts connected in series with the heating element of the device for maintaining substantially constant the voltage across the contacts, one of said contacts being controllable by said thermally responsive voltage regulator, the second contact being connected to the source of electric power, the arrangement being such that the average energy flowing through said heating element will be maintained substantially constant irrespective of any variations in the resistance of the instrument and/or variations of voltage at the source.

4. In combination, a source of electric power connected in series to a thermally responsive voltage regulator member provided with a heating element, a pair of contacts connected in series with the heating element, said contacts being actuated in response to thermal change in said thermally responsive member for controlling the flow of energy through the heating element, a thermally responsive indicating device provided with a heating element, a variable resistor connected in circuit with the heating element of the indicating device to control the flow of energy through the heating element of the indicating device, means responsive to variations in a physical condition for varying said resistor, and said indicating device and said resistor being connected in parallel with said voltage regulator member whereby said voltage regulator member maintains substantially constant the average voltage across said indicating device irrespective of any variations in the resistance of the heating element of the device and/or variations of voltage at the source.

5. In an electrical indicating system, a source of electrical power, a thermally responsive indicator member, an electric heating element associated with said thermally responsive member, a pivotally mounted indicator pointer, said member being adapted to move said indicator pointer in correspondence with the electrical heating effect thereof, an electrical contact, a second thermally responsive member adapted to intermittently engage said contact to cause current pulsations whose aggregate heating value at the second thermally responsive member in a given interval is substantially constant despite voltage variation, a heating element associated with said second thermally responsive member, circuit conductors connecting said contact and said heating element associated with the second thermally responsive member in series with the power source and connecting the power source and said heating element in parallel with the heating element of the thermally responsive indicator member, a resistor connected in circuit with the heating element of the thermally responsive indicator member, and a contact member, movable over the resistor, responsive to variations in a physical condition to alter the energy traversing said indicator heating element and correspondingly alter the position of the indicator pointer in accordance with the physical condition.

6. In an electrical indicating system, a source of electric power, a thermally responsive voltage regulator provided with a heating element, a thermally responsive indicating instrument provided with a heating element connected in parallel to the voltage regulator, a variable resistor connected in circuit with the heating element of the indicating instrument to control the flow of energy therethrough, means responsive to a condition to be indicated for varying said resistor, and a pair of contacts controlled by said thermally responsive voltage regulator and connected in series with the source of power and the heating element of the voltage regulator, the arrangement being such that the average voltage across the heating element of the voltage regulator will be maintained substantially constant irrespective of any variations in the resistance of the heating element of the instrument and/or variations of voltage at the source.

7. In an electrical indicating system, a source of electric power, a thermally responsive voltage regulator provided with a heating element connected in series with said source of power, a thermally responsive indicating instrument provided with a heating element connected in parallel to the voltage regulator, a variable resistor connected in circuit with the heating element of the indicating instrument to control the flow of energy therethrough, means responsive to a condition to be indicated for varying said resistor, and a pair of contacts controlled by said thermally responsive voltage regulator and connected in series with the source of power and the heating element of the voltage regulator whereby all of the available electrical energy will flow continuously from the source of power through the heating element of the voltage regulator and the parallel circuit including the indicating instrument when the contacts are closed.

THEODORE J. SMULSKI.

REFERENCES CITED

The following references are of record in the file of this patent:

UNITED STATES PATENTS

| Number | Name | Date |
|---|---|---|
| 2,205,637 | Smulski | June 25, 1940 |
| 2,275,237 | Smulski | Mar. 3, 1942 |